June 12, 1956  J. O. LEWIS  2,750,109
APPARATUS FOR INTEGRATING A VARIABLE AGAINST TIME
Filed Aug. 25, 1950  3 Sheets-Sheet 1
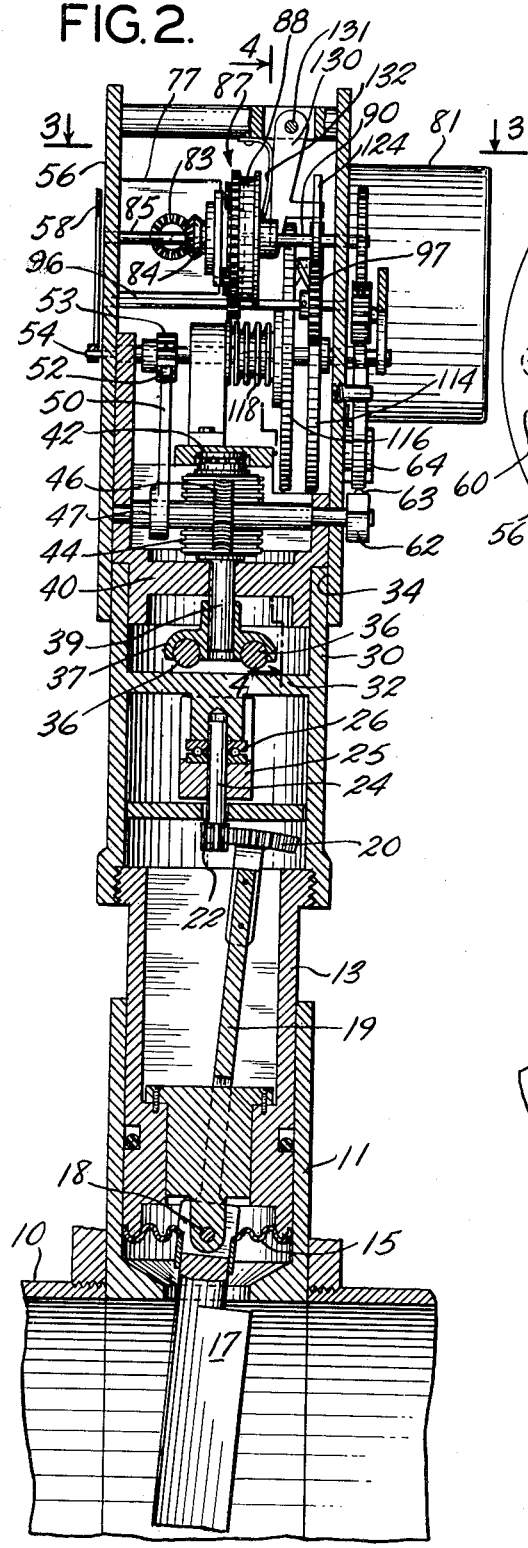
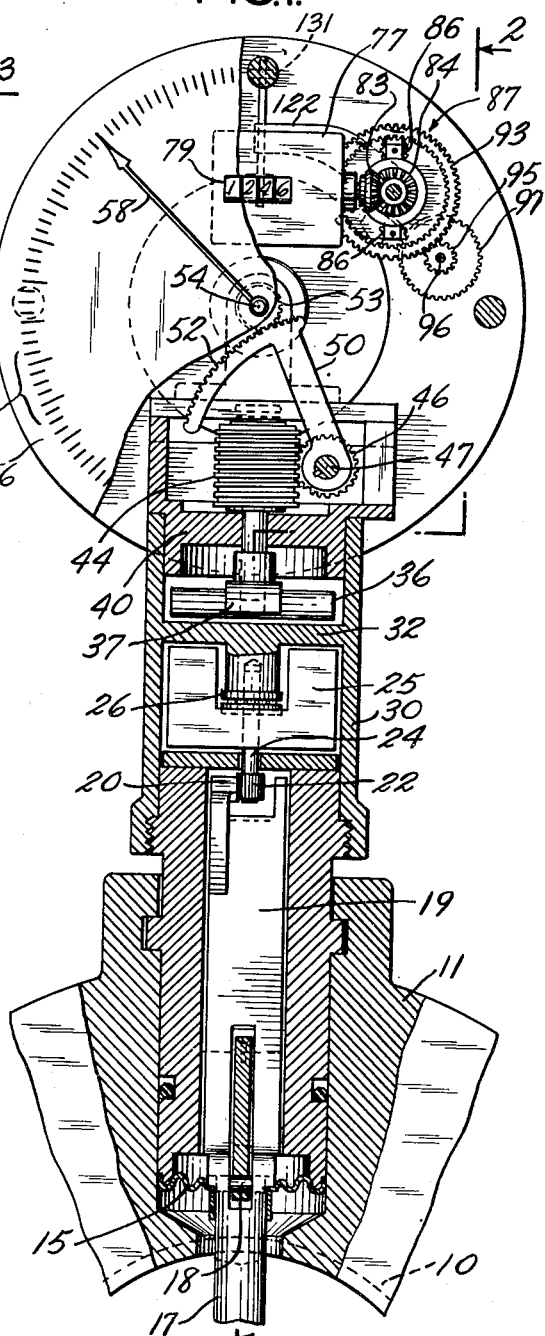
INVENTOR.
John O. Lewis
BY Emery Varney,
Whittemore & Dix.
ATTORNEY.

INVENTOR
John O. Lewis
BY Emery Varney
Whittemore Hulbert
ATTORNEY

June 12, 1956     J. O. LEWIS     2,750,109
APPARATUS FOR INTEGRATING A VARIABLE AGAINST TIME
Filed Aug. 25, 1950     3 Sheets-Sheet 3

INVENTOR
John O. Lewis
BY Emery Varney,
W. Wittemore Dix.
ATTORNEY

United States Patent Office 2,750,109
Patented June 12, 1956

2,750,109

APPARATUS FOR INTEGRATING A VARIABLE AGAINST TIME

John O. Lewis, Woodside, N. Y., assignor, by direct and mesne assignments, to Flowflax Corporation, New York, N. Y., a corporation of New York Application August 25, 1950, Serial No. 181,516

6 Claims. (Cl. 235—61)

This invention relates to apparatus for measuring the amount of material that flows through a conduit, and more particularly to measuring apparatus that integrates the flow rates over a time period.

It is an object of the invention to provide an improved integrating flow meter which is simple in construction, reliable in operation, and which operates in response to the weight of material flowing. The invention will be described as applied to the measuring of liquid flow, but it will be understood that the invention can be used also for measuring gas or even granular material such as grain.

A more specific object of the invention is to provide a flow meter that operates a counter for limited periods during successive cycles, with the length of time that the counter runs proportional to the rate of flow. It is a feature of the invention that the counter operates to integrate the measurements and thus gives the total flow over the period of time for which the flow meter is in use. This principle of operation makes it possible to reduce the size and cost of flow meters as compared with integrating flow meters of the continuously operating type. Even though the counter runs only part time in the flow meters of this invention, the meter has a hand that operates over a dial to indicate instantaneous flow rates at all times.

Another feature of the invention relates to calibrating means that compensate for non-uniform variation in the pressure of the operating fluid with changes in the rate of flow. This compensation is preferably obtained by providing a spring that reacts against the flow-displaced element and that bends against one or more stops which change the free length of the spring and vary its strength to produce the desired compensating force for each position of the flow displaced element. In the preferred construction, adjustable stops are used for adapting the apparatus to different density of material, the flow of which is to be measured. The invention also includes features for convenient changes in range by changing the ratio of the operating gears, and by changing the dial across which the indicating hand moves.

Another object of the invention is to provide an improved flow meter with mechanism for recording the flow at one or more locations connected with the flow-operated mechanism only by electric conductors. This object is obtained by a modified form of the invention operated partly by electricity, but the more basic embodiment of the invention requires no electricity for its operation.

Other objects, features and advantages of the invention will appear or be pointed out as the description proceeds.

In the drawing, forming a part hereof, in which like reference characters indicate corresponding parts in all the views, Fig. 1 is a front view, mostly broken away and in section, of a flow meter embodying this invention.

Fig. 2 is a sectional view taken on the line 2—2 of Fig. 1.

Figs. 3 and 4 are sectional views taken on the lines 3—3 and 4—4 respectively of Fig. 2.

Figure 5:
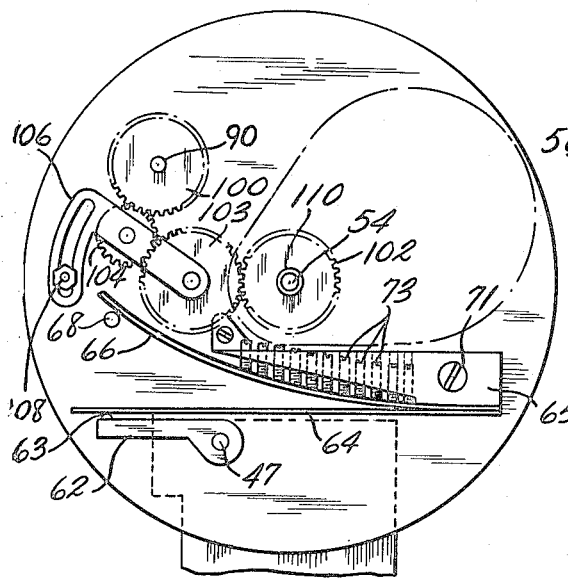
Fig. 5 is a view of the back of the flow meter head showing the means for controlling the variation in tension of the calibrating spring, and with the motor removed in order to show the train of driving gears more clearly.

The flow meter of this invention is intended to be connected with a pipe 10 secured to a pipe fitting 11. The lower portion of the flow meter actuator comprises a sleeve 13 that fits into a socket of the fitting 11. At the lower end of the sleeve 13, there is a diaphragm 15 that forms a partition across the lower portion of the socket in the fitting 11.

The flow meter has a vane 17 extending downwardly into the stream of liquid or other material that flows through the pipe 10. The diaphragm 15 serves to seal off the portion of the flow meter above the diaphragm from the chamber that is under the diaphragm and in direct communication with the interior of the pipe. The construction of this portion of the apparatus is fully described in my copending application Serial No. 125,825. For purposes of this invention it is sufficient to understand that the vane 17 is rocked about a pivot axis 18, and that this angular movement is transmitted through a lever 19 that carries a gear segment 20. This segment 20 is moved back and forth to actuate a pinion 22 which meshes with the gear segment.

The pinion 22 is secured to the lower end of a shaft 24, and this shaft is connected with a magnet 25. The shaft 24 is equipped with a thrust bearing 26 and the upper end of the shaft 24 turns in a bearing in a housing 30 connected to the upper end of the sleeve 13.

The upper portion of the housing 30 is divided by a partition 32 which closes the upper end of the chamber, in the sleeve 13 and housing 30, above the diaphragm 15.

The only connection between the operating mechanism below the partition 32, and the flow meter head above the partition is by magnetic attraction through the partition 32. This partition 32, and the entire housing 30, are made of non-magnetic material. The upper portion of the flow meter has recesses 34 that fit over the upper end of the housing 30 above the partition 32. The assembled position of the flow meter head on the housing 30 is determined by the top edge of the housing which contacts with a shoulder at the ends of the recesses 34. When the flow meter head is in its assembled relation on the housing 32, there are bar magnets 36 secured to a holder 37 immediately above the top face of the partition and well within the magnetic field of the horseshoe magnet 25 located below the partition 32.

The holder 37 is connected to the lower end of a shaft 39 which extends through a bottom 40 of the flow meter head. The shaft 39 turns in the bottom 40 as one bearing and has a thrust bearing 42 at its upper end. A worm 44 is secured to the shaft 39 and turns as a unit with the shaft. The worm 44 drives a worm wheel 46 that is connected to a shaft 47 which has its opposite ends journaled in portions of the front and back walls of the flow meter head. A thrust bearing 48, at the lower end of the worm 44, fits into a recess in the bottom face of the worm. It is a feature of the invention that the worm 44 and worm wheel 46 comprise an irreversible gearing connection through which the shaft 39 can rotate the mechanism of the flow-meter head, but the flow-meter head mechanism cannot turn the shaft 39. Near the forward end of the shaft 47 there is an arm 50 keyed to the shaft 47 and carrying a gear quadrant 52 at its outer end. This gear quadrant 52 meshes with a pinion gear 53 on a shaft 54. One end of the shaft 54 extends forward through a dial face 56 and there is an indicator hand 58 attached to the shaft 54. This indicator hand 58 moves around a graduated scale 60 on the dial of the flow meter.

At the rearward end of the shaft 47, there is a crank arm 62. This crank arm is secured to the shaft 47 and it has a contact pin 63 near one end for thrusting back a spring 64 as the shaft 47 rotates in a direction to indicate greater flow.

The operation of the crank 62 can best be understood by reference to Fig. 5. The spring 64 is anchored at its right hand end to a fixed block 65, and the other end of the spring 64 contacts with the pin 63. Above the spring 64 there is a second spring 66 which is held against forward movement by a pin 68 at one end and by a connection with the block 65 at the other end. As the crank 62 is turned in a clockwise direction, it bends the spring 64 into contact with the calibrating spring 66. This decreases the effective length of the spring 64 and increases the force of the lever 62 required to further flex the spring 64. The curve of the calibrating spring 66 determines the variation in pressure required to cause further flexing of the spring 64, and in order to control the curve of the calibration spring 66, there is a block 65 secured to the back of the flow meter head by a screw 71, and there are closely spaced screws 73 threaded through successive holes in the block 65.

By adjusting the screws 73, the calibrating spring 66 can be given any desired variation in curvature over a fairly wide range. The reason that this is desirable is because of the fact that the displacement of the vane in response to flow of material being measured does not vary in displacement at a rate which is directly proportional to the flow. In order to have the indicator hand, and the positions of other parts of the flow meter mechanism, change so that the graduations on the dial are evenly spaced, the spring 64 must be one in which variations in compression are not directly proportional to displacement. The resistance encountered by the crank 62 moving against the pressure of the spring 64 is transmitted to the vane 17 through the magnetic coupling formed by the bars 34 and the horseshoe magnet 25.

This construction in which the leaf spring 66 spans the space between the calibrating screws 73 makes the apparatus obtain more accurate results because the calibrating screws can be adjusted to give the spring 66 the theoretically correct shape for obtaining the desired variation in the length of the spring 64. In earlier constructions in which a moving spring has been used in combination with calibrating screws with which it contacts directly, the results obtained are accurate only at the various points at which the spring comes into contact with each calibrating screw. As the spring continues to move, the results obtained with such apparatus become increasingly less accurate until the spring contacts with the next calibrating screw.

Referring again to Fig. 1, there is a counter 77 in the flow meter head, and this counter has digit cylinders that are exposed through an opening 79 in the dial 56 of the flow meter. The counter is driven intermittently from a continuously operating motor 81, such as a clock motor, and through mechanisms which makes the period of operation of the counter proportional to the flow indicated by the hand 58 during each cycle of operation of the operating mechanism that is driven by the motor.

The flow meter can be designed for cycles of different length depending upon the use for which the meter is intended. In the preferred construction, the gears within the flow meter are selected to give a cycle between 6 and 15 seconds, though cycles as long as one minute can be used successfully for measuring flows which do not vary substantially and where the total time of flow extends over a number of hours.

Referring to Figs. 1 and 2 counter 77 has a bevel gear 83 that meshes with a similar gear 84 on a shaft 85. There are arms connected to this shaft 85 and planet gears 86 of a planetary transmission 87 turn on stud axles extending from these arms. The planet gears 86 mesh with teeth on the inside of a housing 88 surrounding these gears 86, and the gears 86 also mesh with a sun gear secured to a shaft 90. This is a well known type of transmission, and for purposes of this invention it is sufficient to understand that power is supplied to the transmission through the shaft 90 and that when the housing 88 of the transmission is free to rotate, it does so without transmitting any power to the shaft 85. When the free rotation of the housing of the transmission is retarded, or stopped, the sun gear forces the planet gears 86 to roll around the internal gear within the transmission housing 88, and an orbital movement imparted to the axles of the planetary gears rotates the shaft 85 which drives the counter.

The transmission 87 has gear teeth 93 around the outside of its housing 88 and these gear teeth mesh with a pinion gear 95 on a shaft 96 with a control gear 97. The rotation of the shaft 96 and the housing 88 of the transmission 87 is stopped, whenever the counter is to be operated, by projecting a locking pin into a space between teeth of the control gear 97, in a manner which will be explained.

Figure 3:
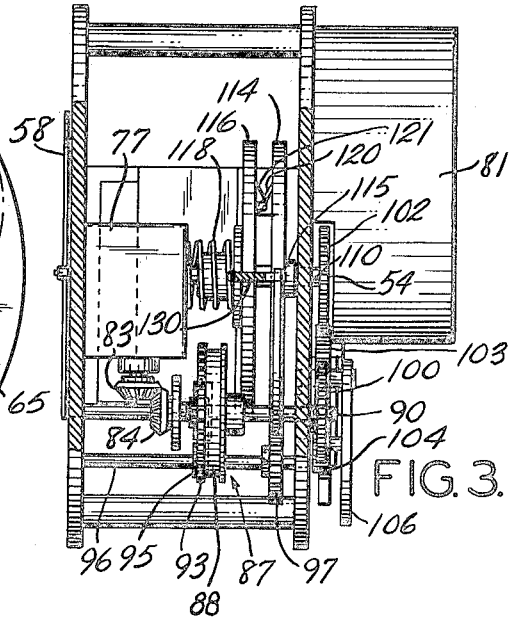

Referring to Figs. 3 and 5, the shaft 90 projects through the back of the flowmeter and has a gear 100 secured to its rearward end. The gear 100 is driven from the clock motor 81 through gears 102, 103 and 104. The purpose of this gear train is to provide for changes in the gear ratio between the clock motor and the shaft 90 that drives the counter. The calibration of the flowmeter can be changed, for measuring the flow of different densities of material, by placing larger or smaller gears on the shaft 90 in place of the gear 100. The difference in the diameter of the various gears used on the shaft 90 can be compensated for by moving the idler 104 into whatever position is necessary to make it mesh with the new gear.

The idler 104 is carried on an arm 106 which swings about the axis of gear 103, and thus the gear 104 always meshes with the gear 103 for all positions of the arm 106, a screw 108 extending through an arcuate slot in the arm 106 is used to hold the arm 106 in any desired adjusted position. The center of curvature of the slot in the arm 106 is on the axis of rotation of the gear 103.

The gear 102 is connected to a sleeve 110 that turns freely on the shaft 54. There is a disk 114 connected with the other end of the sleeve 110, and a thrust bearing 115 prevents rearward movement of the disk 114 during the operation of the flowmeter. There is another disk 116 keyed to the shaft 54 and movable axially on the shaft. A spring 118 urges the disk 116 rearwardly on the shaft 54.

There is a sloping projection 120 on the disk 114 and a complementary projection 121 on the disk 116. The sloping projections 120 and 121 are located at substantially the same distance from the common axis of rotation of the disks. As the disk 114 rotates continuously by virtue of its driving connections with the motor 81, the projection 120 comes into contact with the projection 121 on the disk 116 and exerts a cam action which forces the disk 116 forward along the shaft 54 and against pressure of the spring 118. Thus the disk 116 is thrust forward at each revolution of the disk 114. As soon as the projection 120 has passed the projection 121, the disk 116 moves rearwardly again under the influence of its spring 118.

Since the disk 116 is keyed to the shaft 54 which turns the indicator hand 58 of the flow meter, it will be apparent that the phase angle of the sloping projection 121 depends at all times upon the position of the indicator hand 58 which in turn depends upon the rate of flow that is being measured. A locking pin 123 (Fig. 4) is secured to one end of a locking lever 124; and this lever is supported by the shaft 90 and is freely movable about the axis of the shaft. When the locking lever 124 is in the position shown in Fig. 4, the pin 123 is disengaged from the teeth of the control gear 97, but when the lever 124 drops down into the dotted line position shown, it engages between teeth of the gear 97 and stops rotation of the shaft 96.

When the locking lever 124 is rotated clockwise about the shaft 90, the locking pin 123 is withdrawn from the teeth of the gear 97 and the gear 97 is free to rotate. There is a cam element 125 extending outwardly from the periphery of the disk 114 in position to engage a cam follower 127 on the locking lever 124. Each time that the cam element 125 passes the cam follower 127 and the locking lever, the locking lever is moved to disengage the pin 123 from the control gear 97.

The locking lever 124 is held in elevated position with the locking pin 123 free of the control gear 97 by a latching lever 130 which hangs down from a fulcrum 131. The upper end of the locking lever 124 extends over a forwardly extending ledge of the lever 130, as best shown in Fig. 2.

The latching lever 130 is urged rearwardly by a spring 132 so that its normal position is the position shown in Fig. 2 in which the latching lever supports the locking lever 124 and prevents it from stopping rotation of the control gear 97.

Figure 4:
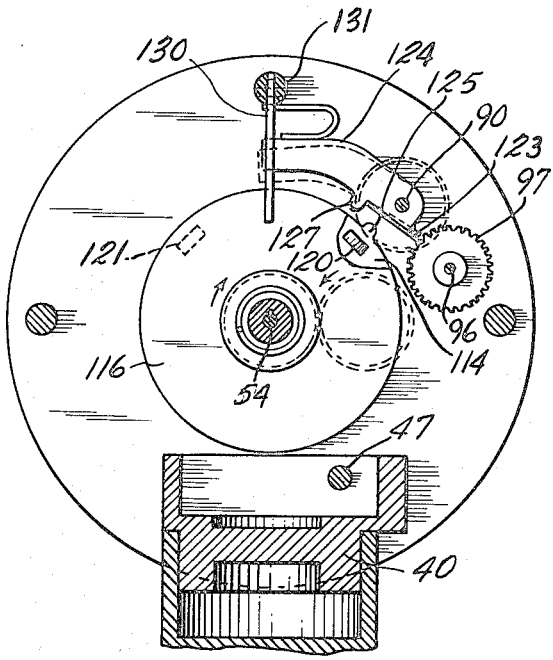

The lower end of the latching lever 130 extends downward across a part of the front face of the disk 116 so that as the disk 114 rotates clockwise in Fig. 4, as indicated by the arrow, the sloping projection 120 comes into contact with the complementary projection 121 on the disk 116 and thrusts this disk 116 forward, against the pressure of the spring 118 for a brief period while the projection 120 is passing the projection 121. This forward movement of the disk 116 causes the lever 130 to rock clockwise in Fig. 2.

This movement of the latching lever 130 allows the locking lever 124 to drop and stop the control gear 97. The time at which this occurs depends upon the phase angle of the disk 116, which in turn depends upon the rate of flow indicated by the gauge hand 58.

The operation of the counter begins whenever the locking lever is allowed to drop into position to stop the control gear 97. The control gear 97 remains locked against rotation until the continued rotation of the disk 114 brings the cam element 125 (Fig. 4) into position to lift the locking lever 124 and release the control lever 97. The parts are so related that the cam element 125 is under the cam follower 127 and in position to prevent the locking lever 122 from dropping, whenever the tapered projections 121 and 122 engage each other with the gauge hand in the zero position. This means that the counter never runs when the gauge hand is indicating a zero flow.

As the flow indicated by the gauge hand increases, the disk 116 carries its tapered projections 121 into different phase angle positions that cause the locking lever 121 to drop, and stop the control gear 97 for progressively longer periods before the cam element 125 reaches the cam follower 127.

The length of time that the control gear 97 is locked, and the resulting length of time that the counter is driven, thus depend upon the rate of flow indicated by the gauge hand. Since the flow meter undergoes a cycle of operation each time that the cam element 125 makes a revolution, the flow meter integrates the existing separate flow rates encountered with each cycle of operation.

Figure 6:
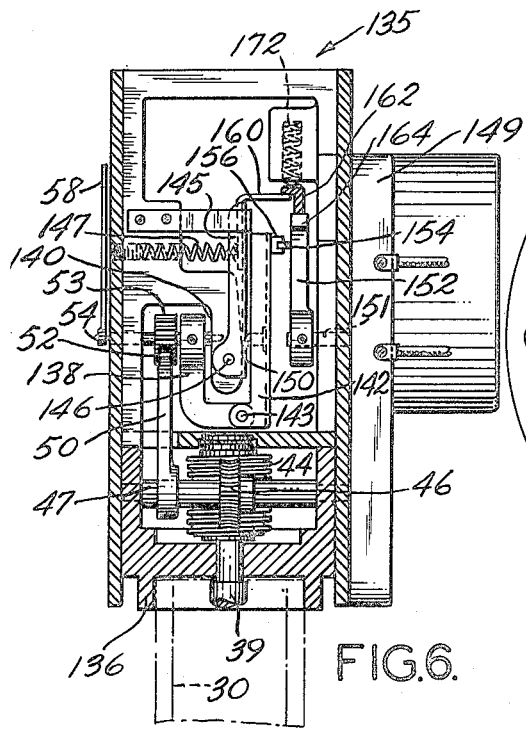
Fig. 6 is a sectional view of a modified form of the invention having a flow meter head for recording the flow at a station remote from the meter head.

Fig. 6 shows a modified form of the invention in which the flow meter 135 has a head with a frame 136 that fits over the housing 30 and that has a shaft 39 extending downward to a magnetic coupling similar to that used in Figs. 1 and 2. The construction in Fig. 6 also has a worm 44 at the upper end of the shaft 39, and this worm meshes with a worm wheel 46 on a shaft 47 journaled in the frame 136. An arm 50, keyed to the shaft 47, carries a gear quadrant 52 which meshes with a pinion gear 53 on a shaft 54. This construction is also similar to that of the flow meter shown in Figs. 1 and 2.

There is an arm 138 secured to the shaft 54 and movable angularly as a unit with the shaft. The inner end of the shaft 54 is supported by a frame extension 140, and the arm 138 extends downwardly and then rearwardly under the frame extension 140.

At the rearward end of the arm 138 there is an upwardly extending arm 142 connected at its lower end, by a pivot 143, to the arm 138. This arm 142 extends across the axis of the shaft 54.

A latching element 145 is connected with the frame extension 140 by a pivot pin 146. The latching element 145 is urged rearwardly by a spring 147 which extends from a socket in the frame into contact with the front face of the latching element 145. The latching element 145 is urged forwardly, against the tension of its spring 147, by a button 150 carried by the arm 142 in position to contact with the rearward face of the latching element 145 at the axis of the shaft 54. With this construction, the button 150 contacts with the latching element 145 at the same place regardless of the angular movement of the arm 138. This arm 138 and upwardly extending arm 142 move into various phase angle positions about the axis of the shaft 54 depending upon the displacement of the quadrant 52.

The modified flow meter 135 includes a uniform-speed motor 149, which may be any electric clock motor and this motor drives a shaft 151 with continuous motion. This shaft 151 may be referred to as the clock shaft because its successive revolutions measure the passage of time. A cam 152 is secured to the shaft 151 by a set screw. This cam 152 has a rise 154 on its side face in position to displace a cam follower 156 at the end of the upwardly extending arm 142. Thus, whenever the cam 152 makes a revolution with the clock shaft 151, the rise on the front of the cam 152 displaces the cam follower 156 and displaces the upwardly extending arm 142 and the latching element 145 behind the arm 142. This operation rocks the latching element 145 counterclockwise about its pivot 146 and causes a latch 160 to move out from under a switch-operating arm 162.

The cam 152 also has a peripheral rise 164 which raises the switch-operating arm 162 above the level of the latch 160 during passage of the rise 164 under the arm 162. At all other times the switch operating arm 162 is free to move downward whenever the latch 160 is withdrawn. A microswitch 166 (Fig. 7) is attached to the frame 140 and has an operating button 168 projecting through the face of the switch housing. The switch-operating arm 162 is supported from the frame by a pivot 169. When the switch operating arm 162 swings in a counter-clockwise direction about the pivot 169 the arm pushes the button 168 inward and operates the micro-switch 166; but when the switch-operating arm 162 swings in a clockwise direction about the pivot 169, it permits the button 168 and the micro-switch to return to its normal position to which it is urged by its spring bias.

In the illustrated construction the micro-switch 166 has a bias toward open position. In spite of the bias of the switch 166 toward open position, the entire switch and switch operator assembly normally maintains the switch 166 closed because this assembly includes a spring 172 which bears against the forward end of the switch operating arm 122 with a force strong enough to hold the contact switch button 168 pressed in.

The switch operating arm 162 is rocked clockwise about its pivot 169 once during each revolution of the upwardly extending arm by the peripheral cam element 164 that displaces a cam follower element 174 extending downward from the switch-operating arm 162.

Figure 7:
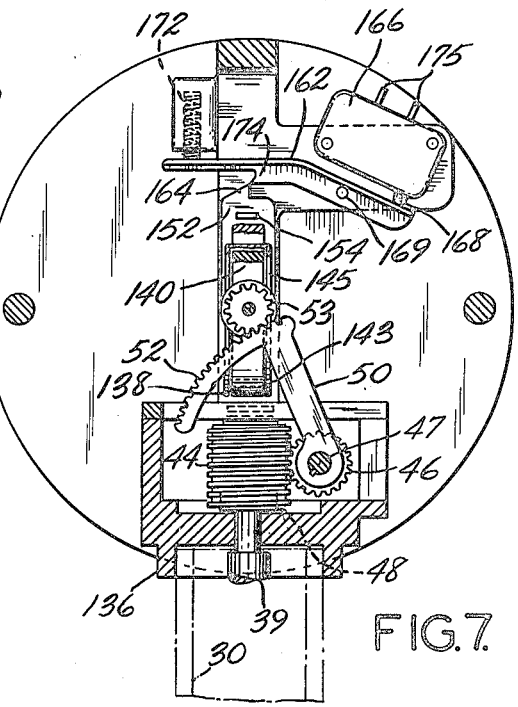
Fig. 7 is a fragmentary front view of the apparatus shown in Figure 6.

From the description of the construction shown in Figs. 6 and 7, it will be apparent that the latching element 160 is thrust rearwardly once during each revolution of the cam 152, some time after the arm 162 has been lifted by the cam element 164 into its raised and latched position and the time of such rearward, unlatching movement depends upon the displacement of the arm 138 which, in turn, depends upon the position of the shaft 54 and the indicator hand 58. It will be apparent also that the switch-operating arm is rocked counter-clockwise by the spring 172 to operate the micro-switch 166 each time that the latching element 160 is moved forwardly by pressure of the button 150 against this latch arm. Thus the length of time that the micro-switch 166 is in operating position depends upon the phase angle relation of the arm 138 and the latching element 145, and this is a measure of the rate of flow in the pipe to which the flow meter is connected.

Figure 8:
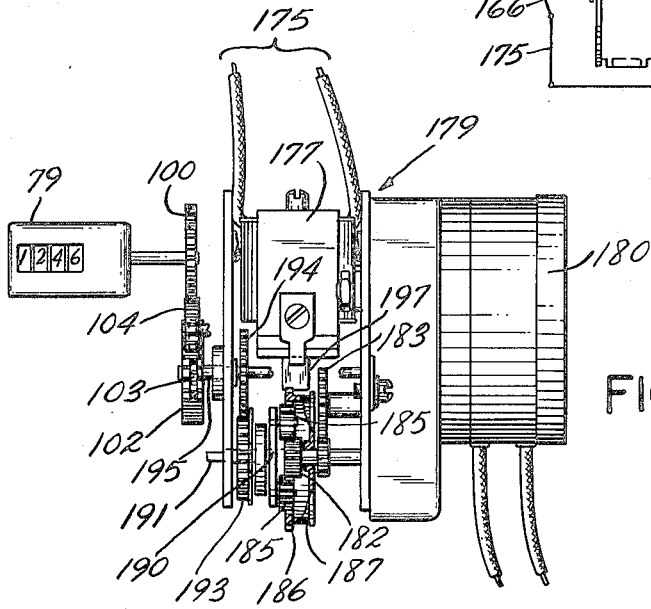
Fig. 8 is a partly diagrammatic, fragmentary view of the apparatus at the recording station for operation by the flow meter head shown in Figures 6 and 7.

There are conductors 175 leading from the micro-switch 166. One of these conductors 175 connects directly with a power line and the other connects with a solenoid 177 (Fig. 8) of a remote indicator 179 of the flow meter. This remote indicator includes a uniform speed electric motor 180 that drives a sun gear 182 through connecting gearing 183. This motor 180 serves as the "clock" of the indicator. The sun gear 182 meshes with planet gears 185 which in turn mesh with an internal gear 186 inside of a housing 187. The planet gears 185 turn on axles carried by an arm 190 secured to a shaft 191. A spur gear 193 on the shaft 190 meshes with another spur gear 194 on a shaft 195.

An armature 197 of the solenoid 177 engages the teeth on the outside of the housing 187, to stop the housing, whenever the motion is to be transmitted through the planetary gearing to the shaft 195. Whenever the housing 187 is free to rotate, the planet gears 185 drive the housing and transmit no motion to the arm 190. Whenever the housing 187 is held against rotation, however, the planet gears 185 are forced to roll around the internal gear 186 and this motion causes the planet gears to rotate the arm 190 by which their axles are carried.

The shaft 195 transmits motion to the counter 79 which has a drive shaft with a gear 100 at the end of the drive shaft. This drive shaft and gear are driven from the shaft 195 through gears 102, 103 and 104, the construction being similar to that shown in Fig. 5, so that the calibration of the apparatus can be changed by changing the relative sizes of the gears as fully explained in connection with Fig. 5.

Figure 9:
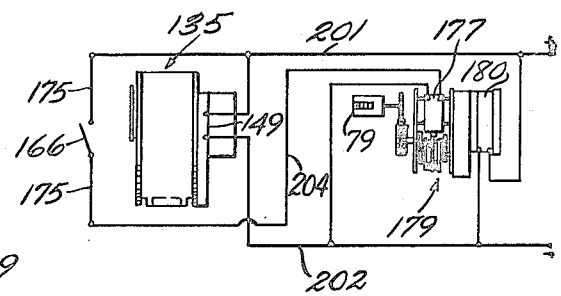
Fig. 9 is a wiring diagram for the apparatus shown in Figs. 6 to 8.

Fig. 9 shows the way in which the flow meter head 135 of Figs. 6 and 7 is connected with the remote indicator 179. The motor 149 is connected across a power line comprising conductors 201 and 202. The motor 180 of the remote indicator is also connected with the power line for continuous operation. The micro-switch 166 is connected across the power line in series with the solenoid 177 so that the solenoid is supplied with power only when the micro-switch 166 is closed. The micro-switch 166 and the solenoid 177 are connected by a conductor 204 which may be of any desired length so that the remote indicator 179 can be located as close to or as far away as desired from the flow meter head 135.

In the construction illustrated, the solenoid 177 allows its armature to drop and causes the planetary transmission to drive the counter 79 whenever there is no current flowing through the conductor 204. The micro-switch 166 is open for only a limited angle of movement during each cycle of operation of the flow meter head 135. Since this angle of movement depends upon the flow that is being measured, it will be apparent that the counter 79 operates during each cycle for a period proportional to the flow.

If it is desired to have the flow meter head 135 indicate the total flow as well as operate the remote indicator 179, then an indicator similar to the indicator 179 can be combined with the flow meter head 135 at the location of the flow meter head. The invention makes it possible to have any number of remote indicators 179 controlled from the same flow meter head 135, it being merely necessary to provide the necessary wiring.

Comparing the principle of the combination illustrated in Fig. 9 with that of the integral flow meter shown in Figs. 1 and 2, it will be apparent that the flow meter head 135 holds the micro-switch 166 open during periods that correspond with the time that the flow meter of Figs. 1 and 2 drives the counter. Since the counter of the remote indicator 179 in Fig. 9 is driven whenever the micro-switch 166 is open, it follows that the counter 79 of Fig. 9 is driven for periods that correspond exactly with the periods during which the counter of Figs. 1 and 2 is mechanically driven, assuming that the flow meter heads in both cases have the same calibration.

The preferred embodiments of the invention have been illustrated and described, but changes and modifications can be made and some features of the invention can be used alone or in different combinations without departing from the invention as defined in the claims.

I claim as my invention:

1. A flow meter comprising a uniform speed motor that serves as a clock for the meter, a motion transmitting mechanism driven by the motor, a counter, intermittently operating elements in the motion transmitting connections for successively driving and operatively disconnecting the counter from the motion transmitting connections, two cam means driven by the motor including one cam means that makes the intermittently operating elements effective to transmit motion, and a second cam means that makes the intermittently operated elements operatively disconnect the counter from said connections, at least part of one of the cam means being shiftable into different phase angle relations with respect to the other cam means, and means operated by a flow responsive element for maintaining the shiftable part of the cam means in a position which is dependent upon the existing rate of flow.

2. A flow meter comprising a counter, a uniform speed motor, motion transmitting connections between the counter and the motor, a latch movable into different positions, in one of which it prevents operation of the counter, and in another of which it leaves the counter free to operate, two motor operated cam means that control movement of the latch between its different positions, including a first cam means that causes the latch to move in one direction and a second cam means that causes the latch to move in the other direction, at least part of one of the cam means being shiftable into different phase angle relations with respect to the other cam means, and a flow responsive element that changes the position of the shiftable part of the cam means.

3. A flow meter including a dial, a hand that moves across the dial, a flow responsive element connected with the hand, a counter, a continuously operating motor that serves as a clock for the flow meter, motion transmitting connections between the clock and the counter including a device operable to prevent motion from being transmitted through said connections to the counter, cam means that render said device operative, other cam means that makes the device inoperative, motion transmitting connections by which both of the cam means are rotated by the motor, at least part of one of the cam means being shiftable into different phase angle relations with respect to the other cam means, and a flow responsive element dependent upon the position of the indicating hand to change the shiftable part of the cam means into said different phase angle relations.

4. A flow meter including a counter, a uniform speed motor that comprises a clock for the flow meter, motion transmitting connections between the clock and the counter operated by the clock through successive cycles and including intermittently operated elements that transmit motion to the counter during only a portion of each cycle, cam means including at least two cam means operated by the clock to control the operation of the intermittently operated elements, a flow responsive element that varies the phase angle of one cam means with respect to the other to change the portion of the cycle between the stopping and starting of the intermittently operated elements, and means for changing the relative speed ratio of the motion transmitting connections and the cams to vary the calibration of the flow meter.

5. The flow meter described in claim 4 in which the means for changing the relative speed ratio comprise a train of gears, in which gears of different sizes are substituted to change the speed ratio.

6. An integrating flow meter including, in combination, a shaft that is rotated about an axis in response to changes in the position of a vane located in the stream of material to be measured, an irreversible gearing connection through which the shaft is rotated by movement of the vane, an element connected with said shaft for rotation therewith and axially movable with respect to said shaft, spring means urging the element in one direction lengthwise of the axis of the shaft, a counter, an indicator, motion transmitting connections between said shaft and the indicator, an actuator located at a fixed angular position around said axis, a drive motor that runs at a predetermined speed, mechanism driven by the motor through successive cycles, said mechanism including connections for transmitting motion to the counter during portions of each cycle, means for initiating the transmission of motion through said connections, and other means for stopping the transmission of motion through said connections, one of said means including cam mchanism, part of which is on the element that is movable axially with respect to the shaft, and the other of said means including cam mechanism, part of which includes said actuator which is located at a fixed angular position.

References Cited in the file of this patent

UNITED STATES PATENTS

| Number | Name | Date |
|---|---|---|
| 509,508 | Bartram | Nov. 28, 1893 |
| 868,152 | Atkinson | Oct. 15, 1907 |
| 1,208,518 | Dodge | Dec. 12, 1916 |
| 1,249,484 | Pogue | Dec. 11, 1917 |
| 1,548,480 | Obermaier | Aug. 4, 1925 |
| 1,893,214 | Young | Jan. 3, 1933 |
| 2,061,441 | Smith | Nov. 17, 1936 |
| 2,079,069 | Johnson | May 4, 1937 |
| 2,082,539 | Fischer | June 1, 1937 |
| 2,088,568 | Beecher | Aug. 3, 1937 |
| 2,128,413 | Hejduk et al. | Aug. 30, 1938 |
| 2,207,423 | Weaver | July 9, 1940 |
| 2,261,655 | Lowe | Nov. 4, 1941 |
| 2,302,458 | Miner | Nov. 17, 1942 |
| 2,309,790 | Ross | Feb. 2, 1943 |
| 2,325,582 | Andersen | Aug. 3, 1943 |
| 2,355,688 | Weingart | Aug. 15, 1944 |
| 2,383,757 | Ziebolz | Aug. 28, 1945 |
| 2,424,511 | Stanley et al. | July 22, 1947 |
| 2,461,488 | Wild | Feb. 8, 1949 |

FOREIGN PATENTS

| Number | Country | Date |
|---|---|---|
| 352,181 | Great Britain | July 9, 1931 |
| 612,841 | Great Britain | Nov. 18, 1948 |
| 679,899 | Germany | Aug. 18, 1939 |
| 715,027 | France | Sept. 21, 1931 |